Aug. 16, 1966     I. WIENER     3,266,161
TOOTH SELECTOR FOR DENTURES
Filed Oct. 16, 1964     2 Sheets-Sheet 1
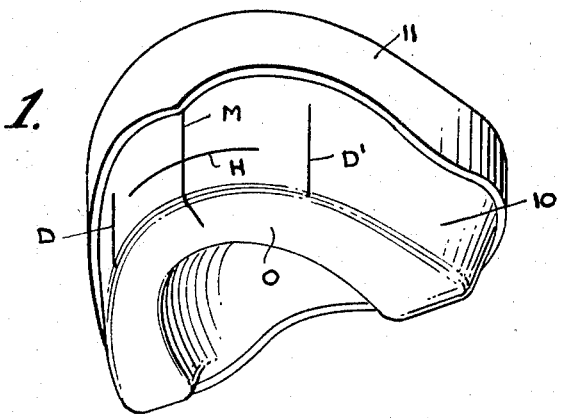
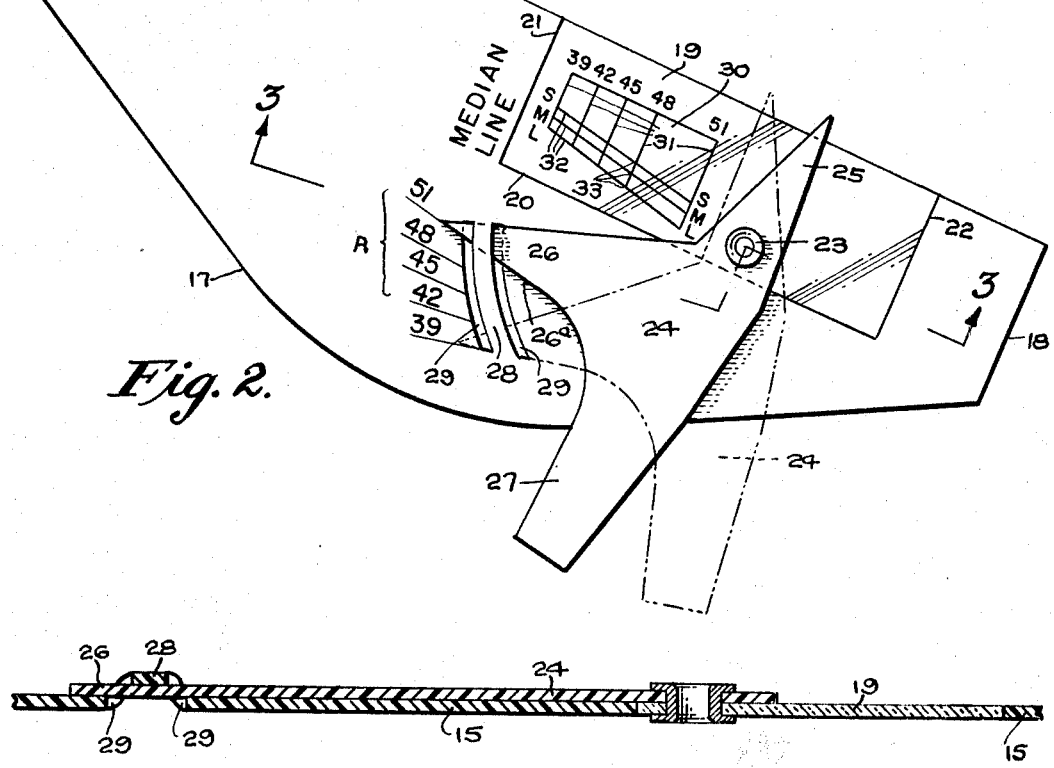
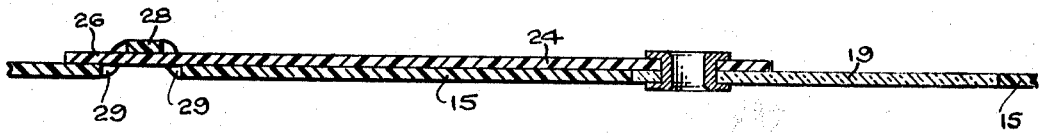
INVENTOR.
ISADORE WIENER
BY
ATTORNEY.

INVENTOR.
ISADORE WIENER
BY Lew Edelson
ATTORNEY

United States Patent Office 3,266,161
Patented August 16, 1966

3,266,161
TOOTH SELECTOR FOR DENTURES
Isadore Wiener, Philadelphia, Pa., assignor to Universal Dental Company, Philadelphia, Pa., a corporation of Pennsylvania
Filed Oct. 16, 1964, Ser. No. 404,242
1 Claim. (Cl. 33—174)

This invention relates generally to the dental art and more particularly to an improved instrumentability designed for use with an initially prepared bite-block to facilitate the selection of the artificial set of maxillary anterior teeth best suited for the particular size and contour of the face of the patient who is being fitted with the new denture.

The factor, aside from color, form and surface configuration, which must be observed in the selection of artificial teeth for the preparation of a denture set of maxillary anterior teeth is primarily one of size, namely, width and length of the teeth required for a particular denture. It is generally accepted that the overall width of the six maxillary anterior teeth, when set up, should equal the distance between the distal faces of the right and left cuspids, which overall width in normal jaws ranges from about 39 millimeters to about 51 millimeters. However, in addition to this overall width dimension, the dental technician must also take into account the necessity of employing, in the denture, teeth of requisite axial length to insure not only proper relation of the maxillary and mandibular anterior teeth to one another so that their incisal edges are brought into contact within a comfortable range of mandibular movement, but also an esthetically correct appearance of the teeth in the mouth having regard to the shape of the mouth, the contour of the lips and the facial expression of the individual for whom the denture is to be prepared.

In order to provide the dental technician with artificial teeth of the various widths and lengths required for dental restorations, there has been developed a coordinated system pursuant to which artificially maxillary anterior teeth are manufactured of three different lengths, namely, short, medium and long, for each set of different overall cuspid-to-cuspid width, which teeth so manufactured have been given mold designations, such as "39S," "39M," "39L," signifying teeth having an overall width of 39 mm. but of different axial lengths, "short," "medium," "long," as measured from the cervical line of the tooth to its incisal edge. Other designations employed in this system are 42S, 42M, 43L and so on up to 51S, 51M and 51L.

Although the dental technician thus does have available for selection different widths and lengths of teeth, he nevertheless is still faced with the problem of selecting that particular set of anterior teeth which is required depending upon the shape and size of the patient's endentulous ridge, the facial contours desired and the degree of reproduction desired of irregularities in the position which the artificial teeth are to assume in simulation of the natural tooth positions.

Having in mind the foregoing, it is among the principal objects of the present invention to provide an instrument by the use of which the dental technician is readily enabled to determine from his previously prepared and marked maxillary bite-block those artificial teeth of the proper size required for his ultimate production of the desired denture.

A further object of the invention is to provide an instrument for the purpose aforesaid which is in the form of a flexible scale which is suitably designed and calibrated to indicate upon one setting of the scale against the bite-block not only the overall width of the maxillary anterior teeth to be used but also whether such selected set of teeth of a particular width should be of long, medium or short axial length.

Still another object of the invention is to provide an instrument of the character aforesaid which not only indicates to the technician the width-length relation of the teeth best suited for a particular denture to be prepared, but also indicates suitable variations in choices which may be made as between teeth of different mold designations should it be desired to intermix teeth of different mold designations so that the six maxillary anteriors may be relatively disposed in other than a standardized arrangement, as by rotation and/or change in elevation of certain teeth to achieve a desired result or effect.

It is also an object of the present invention to provide an instrument of the kind hereinbefore described which is exceedingly simple in design and construction, inexpensive to manufacture and easy to use.

Other objects and advantages of the present invention will appear more fully hereinafter, it being understood that the invention consists in the combination, construction, location and relative arrangement of parts, as described in detail in the following specification, as shown in the accompanying drawings and as finally pointed out in the appended claim.

In the accompanying drawings which illustrate a preferred construction of the device of the present invention and the manner of its use:

FIGURE 1 is a perspective view of a maxillary bite block as conventionally prepared of wax and marked for use in the arrangement of the teeth employed in making up the denture for a particular individual;

FIGURE 2 is a plan view showing in double scale the tooth selecting instrument of the present invention;

FIGURE 3 is a partial longitudinal sectional view of the said instrument as taken along the lines 3—3 of FIGURE 2;

Figure 4:
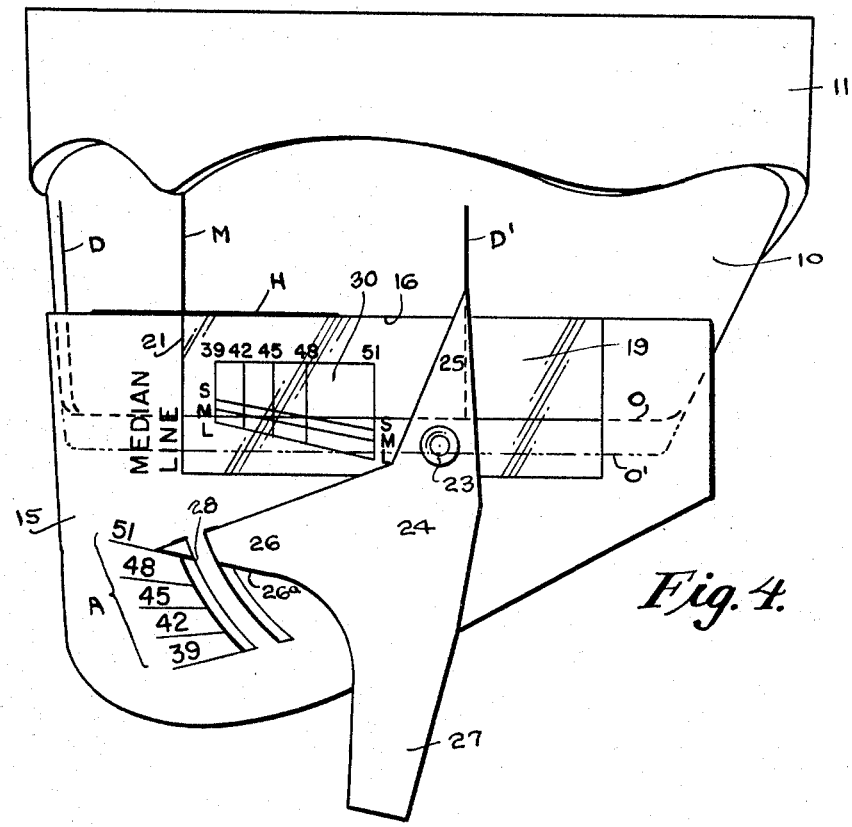
FIGURE 4 is an elevational view showing the application of the instrument of the present invention to a bite block as prepared for a particular individual.

It will be understood that the bite-blocks as shown in the drawings are prepared in accordance with standard procedure in the dental art, the bite-block, designated generally by the reference numeral 10 being in each instance formed of base plate wax. As illustrated the bite-block is suitably secured to a base plate 11 which serves as the temporary foundation on which the trial denture is constructed. The bite-block 10 when attached to its base plate takes the place of the missing teeth and it is upon this bite block that the dental technician arranges the artificial teeth in their desired anatomical relationship. In preparing the bite-block for the requirements of a particular individual, there is inscribed on it the medial line M of the patient's face, the high lip line H and the opposite distal lines D–D′ the distance between which is the above-mentioned cuspid-to-cuspid distal width of the patient's maxillary anterior teeth. The bottom edge O of the bite block represents the occlusal plane of the teeth, which plane is determined by the location of the incisal edges of the central incisors and is thus coincident therewith.

As has been mentioned above, the distance D–D′ measured around the front of the bite block varies in normal faces from about 39 to 51 millimeters. Also for any D–D′ measurement, the distance between the high lip line L and the occlusal plane O will also vary as between different individuals and consequently in properly selecting the six maxillary anteriors for any individual requirement, both of these variables must be taken into consideration. It is to facilitate accurate determination of these variable dimensions and the selection of teeth to properly fit the area embraced within the high lip line H, the occlusal plane O and the distal lines D–D' that the instrument of the present invention has been devised.

Figure 5:
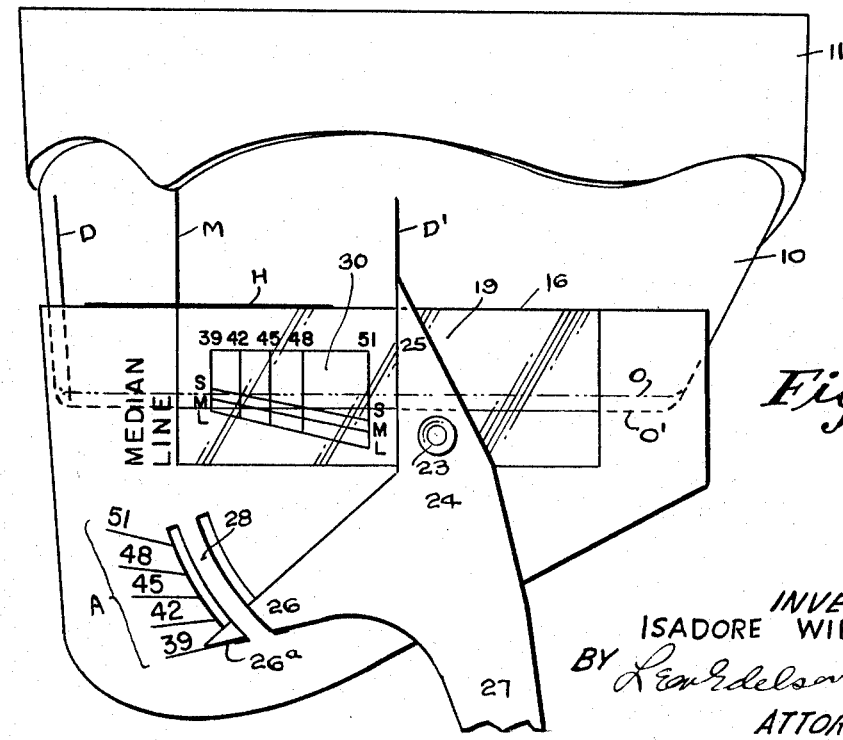
FIGURE 5 is a view similar to FIGURE 4 but showing the application of the tooth selecting instrument to a different bite block.

Referring now more particularly to FIGURES 2 and 3, it will be observed that this instrument basically consists of a relatively thin main body member 15 of flexible material of such elongate outline as to provide it with a straight upper edge 16 extending along the full length of the body member, a curved bottom edge 17 and parallel ends 18—18 extending normal to the upper straight edge. However, it should be noted that the member 15 essentially requires only the straight upper edge 16 and sufficient vertical depth from said edge to receive and contain within its perimeter the other necessary elements of the instrument as will be presently described. Thus, the flexible body member 15 may be of any perimetral outline having at least the straight line upper edge 16. The member 15 may be formed of any suitable flexible material, such as plastic, metal or other composition, which may be stamped, molded or otherwise fashioned to its desired shape. Further, it should be noted that the overall length of the member 15 should be such that when it is bent about the curved front or labial face of the bite-block its opposite end portions respectively overlie the opposite buccal faces of the bite-block to an extent sufficient to enable the member to be held by the fingers of one hand in close surface engagement with the bite-block as shown in FIGURES 4 and 5.

Inscribed within the perimetral outline of the body member 15 is a rectangular area 19 defined by the upper straight edge 16 of the member, by a line 20 spaced from and paralleling said straight edge 16 and by lines 21 and 22 extending normal to the straight edge 16. The line 21, designated on the flexible body member as the MEDIAN LINE is located exactly at the center of the strip and forms one of the two reference lines used in applying the instrument to the bite-block, the second reference line being the straight edge 16 of the member 15.

The rectangular area 19 is formed of transparent material and is of sufficient extent to constitute a window within the perimetral outline of the flexible member through which, when the member is applied to the bite-block with the median line 21 of the member in coincidence with the median line M of the bite-block and the straight edge 16 of the member in coincidence with the high lip line H of the bite-block, there may be observed the occlusal plane O of the bite-block, and the distal line D' as marked on the bite-block. Of course, the transparent or windowed section 19 may be formed in any suitable manner as a part of the main body member, as by molding it integrally with the member in such manner that all of the latter, except for the transparent windowed area, is of opaque or translucent composition or treatment, or it may be separately formed and suitably set into the member 15 as a transparent part thereof. In any case, the transparent section 19 is equally as flexible as the main body member 15 of which it forms a part so that the instrument as a whole may be bent out of its flat plane into curviliner form corresponding to the facial curvature of the bite-block.

Suitably pivoted to the body member 15, as at 23, is an index member or pointer 24 having an upwardly extending pointed arm 25, a laterally extending pointed arm 26 and a downwardly extending manipulating arm 27. The indexing arm 25 is of a length such that its pointed end is disposed just beyond the straight edge 16 of the body member 15, while the laterally extending arm 26 has its outer end projecting through an arcuately shaped guide strip 28 suitably formed in the body member 15. Preferably, this guide strip is formed by slitting the body member, as at 29—29, to provide therebetween the guide strip 28 with opposite ends integral with the member 15 to serve as upper and lower limits between which the laterally extending arm 26 may be shifted upon movement of the manipulating arm 27 in one direction or the other.

Immediately associated with the guide strip 28 in spaced relation along its length are a series of index lines designated 39, 42, 45, 48 and 51 to provide a scale A which denote the different overall widths of maxillary anterior tooth sets available to the dental technician for selection and use in preparing a desired denture. The two pointed index arms 25 and 26 are so relatively proportioned and oriented that when the first arm 25 is swung into a particular position lengthwise of the member 15, as when it is brought into registry with the previously marked distal line D' of a particular bite block, the side edge 26ᵃ of the second arm 26 indicates on the scale A the overall width of the six maxillary anterior teeth which should be selected for trial setting in that particular bite block. The index or pointer 24 thus serves to indicate to the dental technician the most suitable overall width of the teeth required for a particular denture to be prepared in accordance with the markings on the previously prepared bite block.

Since each set of anterior teeth of a given overall width is made up of teeth of three different axial lengths, namely, short, medium and long, the instrument of the present invention also includes within the transparent windowed section 19 thereof a grid 30 to facilitate the dental technician's selection of the proper length of tooth required for a particular denture. This grid 30 consists of a series of laterally spaced vertical lines 31 intersected as shown by a series of vertically spaced sloping lines 32. Each of the vertical lines represents a different overall width in millimeters of a set of maxillary anterior teeth, as will be observed by the designations 39, 42, 45, 48 and 51 at the heads of these lines. Each of the slope lines 32 represent a different axial length of tooth, as will be observed by the designations S for short length, M for medium length and L for long length.

The points 33 of intersection of the slope lines 32 with the vertical lines 31 each indicate the length of tooth as measured vertically along a vertical line from the upper free straight edge 16 of the member 15, which edge as hereinbefore mentioned is adapted in use of the instrument for disposition in coincidence with the high lip line H of the bite-block. Thus, it will be noted, for example, that for a set of anterior teeth having an indicated width of 39 mm., the technician may select one of short (S), medium (M) or long (L) axial length depending upon what is indicated upon application of the instrument to the bite-block as prepared for a given individual.

The grid 30 shows that with increase in the overall width of a set of teeth there is a corresponding increase in the S, M and L lengths of the teeth. Thus, for a set of teeth of 39 mm. overall width, its S, M, and L dimensions are respectively less than those for a wider set of teeth, e.g. the 42 mm. width, and consequently the grid 30 shows fifteen different lengths of teeth for the five different overall widths denoted thereon.

FIGURES 4 and 5 illustrate application of the tooth selector instrument of the present inventions to the bite-block for determining the particular set of anteriors which is best suited for construction of a denture in correspondence with the indications appearing on the bite-block.

FIGURE 4 shows a bite-block 10 upon which have been inscribed the median line M, the distal lines D and D' and the high lip line H and which may have an occlusal plane O or an occlusal plane O'. Obviously, in the case of the bite-block having the occlusal plane O, the teeth selected for trial setting in the block and eventual constructions of the denture would be of shorter axial length than that for the bite-block having the occlusal plane O'.

In order to facilitate proper selection of the anteriors for the particular denture indicated by the previously prepared bite-block, the instrument is applied to the facial surface of the block with its median line 21 in coincidence with the median line M of the block and its upper edge 16 in coincidence with the high lip line H of the block. The indexing member 24 is then rotated to present the pointed extremity of its arm 25 in registry with the distal line D' visible through the transparent window 19 of the instrument, thereby presenting the edge 26a of the arm 26 of the indexing member 24 in exact or approximate registry with one of the width designations denoted on the arcuate numbered scale A.

Thus, in FIGURE 4 the indexing member 24 indicates that the bite block shown in that figure calls for use of a set of maxillary anteriors having an overall width of 51 mm., while in FIGURE 5 the bite block calls for use of a tooth set having an overall width of only 39 mm. It will be apparent, of course, that upon registry of the pointer 25 with the distal line D' of the bite block, a reading may be obtained on the scale A which is somewhere between an adjoining pair of the width designations and in such case the dental technician would select for use that set of teeth which has an overall width closest to the indicated size.

Having thus determined the proper overall width of the teeth to be used in the denture, without disturbing the position of the instrument on the bite block, the technician then observes through the transparent window 19 which one of the slope lines S, M and L most closely approaches the occlusal plane of the bite block in the immediate region of that vertical line which corresponds to the width reading on the scale A, thereby determining whether the selected set of teeth should be of S, M or L length.

Thus, in the instance illustrated in FIGURE 4 which calls for a 51 mm. overall width of the six anteriors, the S length of tooth would be selected for the bite block having the higher occlusal plane O (relatively to the high lip line), while the L length of tooth would be selected for the bite block having the lower occlusal plane O' relatively to the lip line.

In the instances illustrated in FIGURE 5 wherein the bite block calls for a 39 mm. overall width of the six anteriors, the technician would select either the S or M lengths of teeth for the bite block having the higher occlusal plane O and the L length of tooth when the occlusal plane of the bite block is at O'.

It will be understood, of course, that the present invention is susceptible of various changes and modifications which may be made from time to time without departing from the general principles or broad spirit of the invention, such as those necessary for its use in connection with systems having different coordinated code designations for the overall widths and lengths of the teeth making up each maxillary anterior tooth set. Thus, instead of employing width designations which more or less correspond to actual millimeter dimensions for the scale A as hereinbefore described, different designations, not necessarily in millimeter or other linear measure units, may be employed in conformity with those used by different manufacturers of artificial teeth. Accordingly, the present invention is not to be limited to the precise details illustrated and described, except as defined in the appended claim.

What is claimed as new and useful is:

An instrument designed for use in association with a previously prepared bite block for selecting artificial teeth required for a denture comprising: a flat elongated flexible member adapted to be disposed in surface engagement with the labial face of the bite block, said member having a pair of orthogonally related reference lines respectively adapted for linear registry with a horizontally extending high lip line and a vertically extending median line marked on the bite block in conformity with the corresponding lines of the denture to be prepared, indexing means rotatably mounted on said member, and a scale on said member associated with said rotatable indexing means, said indexing means having a pair of angularly related pointers respectively adapted to simultaneously traverse the labial face of the bite block and said scale whereby when one of said pointers is brought into registry with a distal line marked on the bite block the other of said pointers indicates on the scale the overall width of the set of teeth to be selected for use in preparing the denture in accordance with the markings on the bite block, and a transparent window section in said flexible member to one side of its median line through which may be observed the occlusal plane of the bite block when the instrument is bent about the labial face of the bite block with the high lip lines of the instrument and of the bite block in exact registry with one another, said transparent window section being inscribed with a grid formed of laterally spaced vertically extending lines respectively denoting several sets of maxillary anterior teeth each of a different overall distal width and of vertically spaced slope lines arranged in intersecting relation to said vertical width-denoting lines, the points of intersection of said slope lines with each vertical line indicating different lengths of teeth in a set thereof of a given overall width as measured from the high lip reference line of said member to any one of said points of intersection in said grid.

References Cited by the Examiner
UNITED STATES PATENTS

| | | | |
|---|---|---|---|
| 607,295 | 7/1898 | Talbot | 33—174 |
| 2,326,030 | 8/1943 | Hearn | 33—200 |
| 2,332,010 | 10/1943 | Pike | 33—148 |
| 2,475,706 | 7/1949 | Jamieson | 33—174 |
| 2,665,488 | 1/1954 | Tobey | 33—189 |
| 2,767,475 | 10/1956 | Sekora | 33—148 |
| 3,016,779 | 10/1963 | Seamon | 33—174 |

LEONARD FORMAN, *Primary Examiner.*